United States Patent Office 2,877,966
Patented Mar. 17, 1959

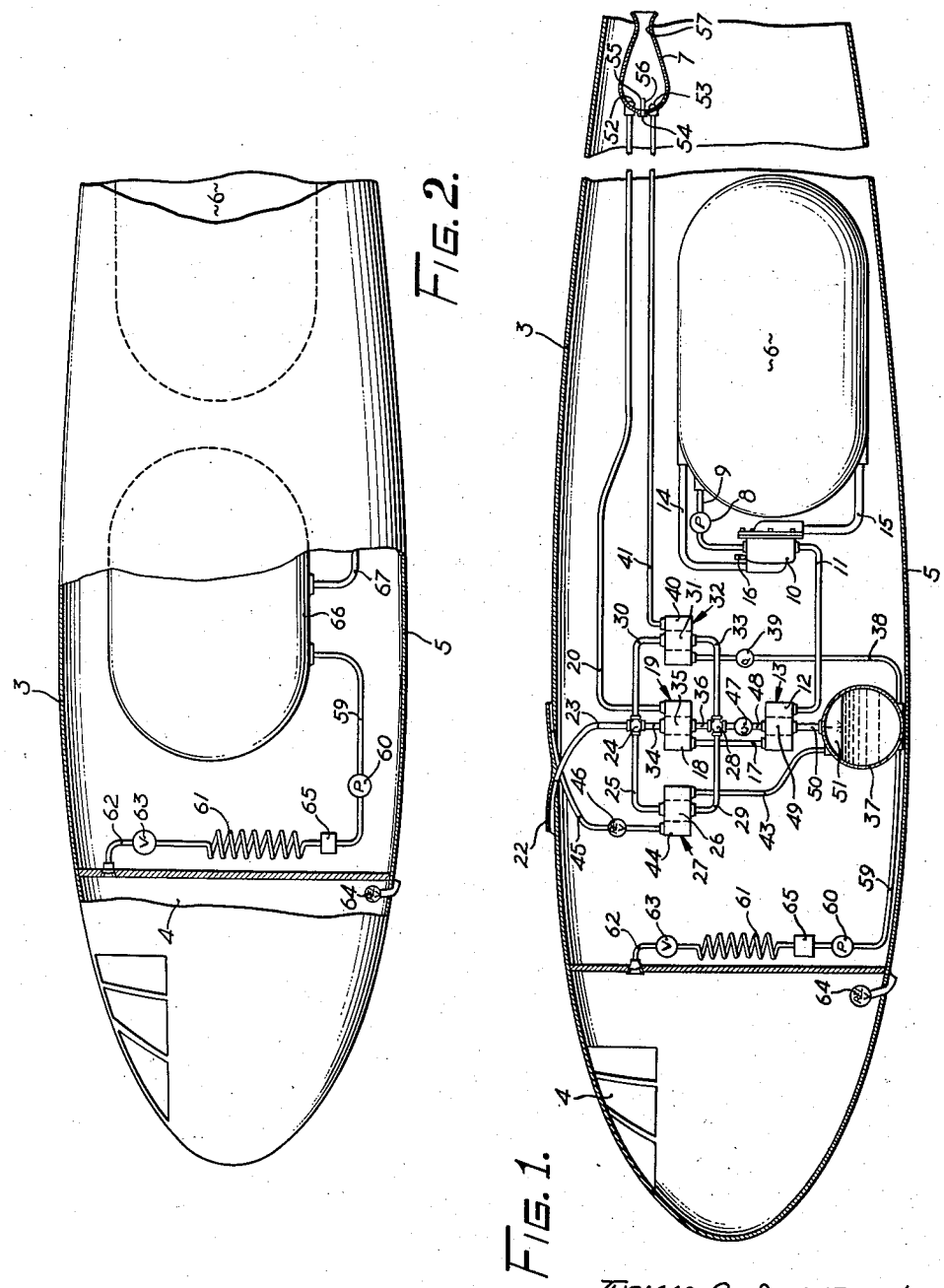

2,877,966

COMMON OXYGEN SUPPLY FOR ENGINE AND CABIN OF HIGH ALTITUDE AIRCRAFT

Thomas O. Summers, Jr., Encino, Calif., assignor, by mesne assignments, to The Garrett Corporation, Los Angeles, Calif., a corporation of California Application March 30, 1955, Serial No. 497,840

5 Claims. (Cl. 244—59)

This invention relates to common oxygen supply for the engine and cabin of a high altitude aircraft and, more particularly, to an oxygen supply system for an aircraft in which the cabin of the aircraft is supplied from the same oxygen supply that is utilized as the oxidant for the fuel which propels the aircraft.

In present types of high altitude aircraft, fuel is combusted with high pressure atmospheric air and the combustion products are passed through a nozzle to propel the aircraft. In such aircraft, it is necessary to carry a supply of oxygen for the flight crew because these aircraft fly at very high altitudes. The oxygen must be carried in tanks which are connected to the personnel compartments of the aircraft through a suitable regulator valve, and the oxygen is utilized solely for the crew. By the present invention, a single oxygen supply can be utilized both for the personnel compartments of the aircraft and as the oxidant for a separate fuel supply carried by the aircraft. In one form of the invention, liquid oxygen for both the personnel and the engine is produced from atmospheric air, and the means for producing the liquid oxygen can be regulated to continually provide only the amount of oxygen needed for continuous operation of the engine and for the aircraft personnel. In another form of the invention, the total liquid oxygen supply required for the engine is loaded into a tank prior to take-off and a small portion of the liquid oxygen is tapped off to supply the personnel compartment.

It is therefore an object of the present invention to provide a common oxygen supply for both the engine and cabin of a high altitude aircraft, which common oxygen supply consists of a single container connected to both the personnel compartment and to the aircraft engine.

Another object of the present invention is to provide a common liquid oxygen supply for a high altitude aircraft which is utilized both as an oxidant for the fuel of the aircraft and as a supply of oxygen for the personnel of the aircraft.

A further object of the present invention is to provide a common liquid oxygen supply for an aircraft which is utilized as the oxidant for the fuel of the aircraft and as a supply of oxygen for the personnel compartment, said liquid oxygen supply being continually produced from atmospheric air in a quantity required to supply both the engine and the personnel.

These and other objects of the invention not specifically set forth above will become readily apparent from the accompanying description and drawings in which;

Figure 1 is a vertical, sectional view of a high altitude aircraft showing the common oxygen supply system in diagrammatic form and illustrating the apparatus for continually producing liquid oxygen from atmospheric air.

Figure 2 is a side elevational view of the aircraft of Figure 1 with parts broken away to show an oxygen system for the personnel compartment which is connected to a large tank carrying the total oxygen requirements for the flight.

Referring to Figure 1, a high altitude aircraft 3 is illustrated having a personnel compartment 4 and a fuselage compartment 5. Storage tank 6, located in the fuselage compartment 5, is utilized to store liquid hydrogen as fuel for the engine and it is understood that other low temperature liquid fuels can be utilized in place of hydrogen. The apparatus for producing liquid oxygen from atmospheric air is also located in the fuselage compartment 5, and jet motor 7 located at the tail end of the aircraft, is connected to the liquid fuel and liquid oxygen supplies. The liquid oxygen apparatus is similar to that disclosed in pending application Serial No. 449,702, filed August 13, 1954, by Randolph Samuel Rae. A pump 8 is contained in the hydrogen supply line 9 and serves to pump hydrogen from the tank 6 to the heat exchanger 10 and to passage 11 which leads to chamber 12 of heat exchanger 13.

The heat exchanger 10 also receives from passage 14 the hydrogen gases evaporating from the liquid in the tank and these gases are cooled by the heat exchanger 10 and returned to an outer shell (not shown) of the tank through passage 15 for the purpose of continually cooling the liquid hydrogen in the tank.

The heat exchanger 10 has a release valve 16 to prevent the pressure of the evaporated gases from exceeding an allowable limit since gases will be continually added to the cooling cycle by evaporation of the liquid hydrogen. The outer chamber 12 connects through passage 17 with outer chamber 18 of heat exchanger 19 and the outer chamber 18 discharges through passage 20 to the jet motor 7. An airscoop 22 takes in a supply of atmospheric air and this supply is connected through passage 23 to a four-way fitting 24. A portion of the incoming air is directed through passage 25 to inner chamber 26 of heat exchanger 27 and is then discharged to another fitting 28 through a passage 29. Another portion of the incoming air passes from fitting 24 through passage 30 to inner chamber 31 of heat exchanger 32 and then passes to fitting 28 through passage 33. A third portion of incoming air is directed through passage 34 to inner chamber 35 of heat exchanger 19 and this inner chamber is connected to the four-way fitting 28 through passage 36.

The liquid oxygen and cold nitrogen gas resulting from the liquification process are both collected in a tank 37. The liquid oxygen is withdrawn from the tank 37 through passage 38 by pump 39 and enters the outer chamber 40 of heat exchanger 32 and this outer chamber is exhausted through a passage 41 which leads to jet motor 7. Also, the cold nitrogen gas at the liquification temperature of the oxygen is directed through passage 43 to the outer chamber 44 of heat exchanger 27 and this outer chamber is connected to atmosphere through a passage 45 which contains a release valve 46. The total incoming air supply arriving at fitting 28 is compressed by compressor 47 contained in a passage 48 which connects the fitting with inner chamber 49 of heat exchanger 13. This inner chamber is connected by a passage 50 to the tank 37 in order to discharge the liquid oxygen and cold nitrogen gas resulting from the liquification process and the nitrogen gas will collect in the upper portion 51 of the tank.

In operation of the invention, the incoming air is precooled in heat exchanger 19, 27 and 32 to about the liquification temperature of the oxygen in the air since the cold nitrogen gases entering heat exchanger 27 are at about the liquification temperature of oxygen and, of course, the oxygen being pumped to heat exchanger 32 is also at about the liquification temperature of oxygen. In addition, the hydrogen fuel passing from heat exchanger 13 to heat exchanger 19 through passage 17 is at about the liquification temperature of oxygen since it has been raised to about this temperature in passing through heat exchanger 13. It is also apparent that the hydrogen gas in passage 20 and the oxygen gas in passage 41 will be at about ambient temperature since air enters the heat exchangers 19 and 32 at ambient temperature and also, the nitrogen gas exhausted through passage 45 will be at about ambient temperature. The heat exchanger 13 will remove sufficient heat from the precooled air entering inner chamber 49 to liquify all the oxygen in the air and the liquid oxygen and the remaining nitrogen gas will be discharged to tank 37. The compressor 47 serves to increase the pressure of the precooled air in order to increase the liquification temperature of the oxygen in the air and this high pressure is maintained in tank 37 by the release valve 46. Thus, at low atmospheric pressures, the liquification temperature of the oxygen can be increased so that more oxygen can be liquified with a given amount of liquid fuel.

The fuel passage 20 connects with jet fitting 52 positioned within the jet motor 7 and the oxygen passage 41 connections with jet fitting 53 positioned adjacent the jet fitting 52 so that the jets are directed to mix the fuel and oxygen. An ignition unit 54 is carried by the jet motor and has two spaced electrical contacts 55 and 56 to provide an ignition spark to ignite the mixture of hydrogen and oxygen within the jet motor 7. The exit of the high pressure, high temperature combustion products from the nozzle end 57 of the motor results in a forward thrust being imparted to the aircraft. Sufficient hydrogen and oxygen will be supplied to the jet motor 7 to provide the necessary thrust for the aircraft and more than one such jet motor can be utilized with the same source of hydrogen fuel and oxygen.

A passage 59 connects with the liquid oxygen supply in tank 37 and contains a pump 60 for pumping liquid oxygen to evaporation coil 61 where the heat absorbed from the surroundings converts the liquid oxygen into a gas. The oxygen gas is connected with the personnel compartment 4 through a passage 62 which contains a valve 63 for regulating the rate of flow and pressure of the oxygen entering the compartment. A relief valve 64 in compartment 4 serves to exhaust the compartment to atmosphere when the pressure in the compartment reaches a predetermined value and a pressure switch 65 is placed in passage 59 at the discharge side of the pump to prevent the pump from building up excessive pressure in the coil 61. Thus, the liquid oxygen in tank 37 serves as a common supply for both the engine and the personnel of the aircraft and sufficient liquid oxygen will be continually produced from atmospheric air for both purposes.

A second form of the invention is illustrated in Figure 2 wherein like reference numerals designate like parts. A large liquid oxygen tank 66 is located in compartment 5 to carry the total supply of liquid oxygen needed during flight so that no liquid oxygen need be produced from atmospheric air. The oxygen for the jet motor 7 leaves the tank through passage 67 and a separate tank 6 for liquid hydrogen is also carried in compartment 5 and connected to the jet motor. The personnel compartment 4 is supplied with oxygen in the same manner as in the first embodiment. The passage 59 containing pump 60 supplies liquid oxygen to evaporation coil 61 where the oxygen becomes a gas and this gas is directed to compartment 4 by passage 62 containing regulating valve 63. The pressure is controlled within the compartment by relief valve 64 and pressure switch 65 controls the operation of pump 60. Therefore the oxygen supply in tank 66 serves as a common source for the aircraft personnel and the jet motor and only a small additional quantity of liquid oxygen need be carried for the personnel. Since the liquid oxygen is not produced during flight, the supply of oxygen is not dependent upon the use of a liquid fuel of a low enough temperature to liquify the oxygen from atmospheric air.

By the present invention, a novel oxygen supply source is provided for a high altitude aircraft. While the oxygen for the personnel has been utilized to supply the personnel compartment 4, it is understood that individual oxygen masks and additional personnel compartments could also be supplied with oxygen from the common source. Also, the oxygen can be utilized as the oxidant for various other types of aircraft engines which operate on any suitable fuel. Various other modifications are contemplated by those skilled in the art without department from the spirit and scope of the invention as hereinafter defined by the appended claims.

What is claimed is:

1. A common oxygen supply for the engine and personnel of a high altitude aircraft comprising a personnel compartment separate from said engine, a supply of fuel and a supply of liquid oxygen located outside said compartment, means for connecting said oxygen and fuel supplies to said engine for combustion within said engine, and a separate oxygen supply system for said personnel compartment comprising a pump connected with said liquid oxygen supply, an evaporation coil connected with said pump for evaporating liquid oxygen received from said pump, passage means connected with said evaporation coil and with said personnel compartment, and valve means in said passage means for regulating the pressure and rate of flow of the oxygen gas from said coil to said compartment.

2. A common oxygen supply as defined in claim 1 wherein said fuel supply comprises a liquid at lower temperature than said supply of liquid oxygen, air scoop means for continually providing a supply of incoming atmospheric air, and heat exchanger means connected with said air scoop means and with said connecting means and utilizing said liquid oxygen supply and said liquid fuel supply as the cooling medium for continually liquefying the oxygen in said incoming atmospheric air at a rate determined by the engine and personnel requirements.

3. In an aircraft, in combination with a personnel compartment and a propulsion engine, a common oxygen supply for said engine and personnel compartment comprising a supply of low temperature liquid fuel, a supply of liquid oxygen for use as the oxidant for said fuel, the temperature of said liquid fuel being lower than the temperature of said liquid oxygen, means connected to said oxygen supply for continually providing a supply of incoming atmospheric air, conduit means interconnecting said oxygen supply and said fuel supply with said engine, liquefying means for continually liquefying the oxygen in said incoming air in order to replenish the supply of liquid oxygen, said liquefying means including elements interconnecting said air supply means in heat exchange relation with said conduit means, said liquefying means utilizing the fuel and oxygen before entering said engine and the nitrogen resulting from the liquefaction process as the cooling medium for said incoming air, and means connected with said liquid oxygen supply for supplying oxygen gas to said personnel compartment.

4. In an aircraft as defined in claim 3 wherein said oxygen gas supplying means comprises an evaporation coil, a pump connected with said evaporation coil and with said liquid oxygen supply for supplying liquid oxygen to said coil, a pressure switch for controlling said pump to prevent excessive pressure in said evaporation coil, passage means for connecting said coil with said personnel compartment, and valve means in said passage means for controlling the rate of discharge of gaseous oxygen from said coil to the personnel compartment.

5. In an aircraft as defined in claim 4 having relief valve means connecting said compartment to atmosphere for limiting the pressure within said compartment.

References Cited in the file of this patent

UNITED STATES PATENTS

| 1,779,162 | Evers et al. | Oct. 21, 1930 |
| 1,991,601 | Lasaux | Feb. 19, 1935 |
| 2,701,514 | Del Mar | Feb. 8, 1955 |
| 2,709,348 | Yendall et al. | May 31, 1955 |

FOREIGN PATENTS

| 11,390 | France | Dec. 11, 1909 |
| | (2nd add. to No. 403,132) | |
| 98,551 | Switzerland | Apr. 2, 1923 |
| 636,150 | Great Britain | Apr. 26, 1950 |